United States Patent [19]
Bishop

[11] 3,947,977
[45] Apr. 6, 1976

[54] PENCIL HOLDER DEVICE

[75] Inventor: Leroy J. Bishop, San Francisco, Calif.

[73] Assignee: Lawrence Peska Associates, Inc., New York, N.Y. ; a part interest

[22] Filed: May 27, 1975

[21] Appl. No.: 568,518

[52] U.S. Cl. ............................ 35/36; 15/443; 401/6
[51] Int. Cl.² ............................................ G09B 11/02
[58] Field of Search ............ 35/36, 37, 38; 401/6, 7, 401/8; 15/443

[56] References Cited
UNITED STATES PATENTS

| | | | |
|---|---|---|---|
| 499,029 | 6/1893 | McMeen | 35/36 |
| 503,796 | 8/1893 | Kingman | 35/36 |
| 629,436 | 7/1899 | Faust | 15/443 |
| 836,652 | 11/1906 | Rosdahl | 15/443 |
| 1,861,241 | 5/1932 | Putnam | 15/443 |
| 1,879,456 | 9/1932 | Parsons | 401/7 |

Primary Examiner—Wm. H. Grieb
Attorney, Agent, or Firm—Richard E. Nanfeldt

[57] ABSTRACT

A pencil holder device is used to hold a pencil in a correct position within a hand of a user for teaching proper penmanship. The pencil holder device consists of a three dimensional body molded as one integral plastic piece, wherein the sidewalls and a portion of the bottom base of the body engage the palm of the user's hand. The forward portion of the body of the pencil holder device is held between the first finger and the thumb of the user. A thin tail section of the body rest on top of the web portion of the hand between the user's thumb and first finger. The pencil is contained within a bore contained within the body, wherein the writing end of the pencil extends outward from a forward end of the body.

2 Claims, 3 Drawing Figures

PENCIL HOLDER DEVICE

SUMMARY OF THE INVENTION

My invention relates to a unique and novel pencil holder device used to hold a pencil or pen in a proper position for writing in a person's hand, wherein the pencil holder device provides a means of teaching proper penmanship.

A number of U.S. Pat. Nos.: 499,029; 503,796; and 629,436 have been employed as pencil holder devices, but these aforementioned patents are non-applicable to my present invention.

An object of my present invention is to provide an inexpensive and simple designed one piece pen holder device used to teach proper penmanship, wherein the device holds a pencil within a user's hand in a correct writing position.

Briefly, my present invention comprises a three dimensional body molded as one integral plastic piece, wherein the sidewalls and a portion of the bottom base of the body engage the palm of the user's hand. The forward portion of the body of the pencil holder device is held between the first finger and the thumb of the user. A thin tail section of the body rests on top of the web portion of the hand between the user's thumb and first finger. The pencil is contained within a bore contained within the body, wherein the writing end of the pencil extends outward from a forward end of the body.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
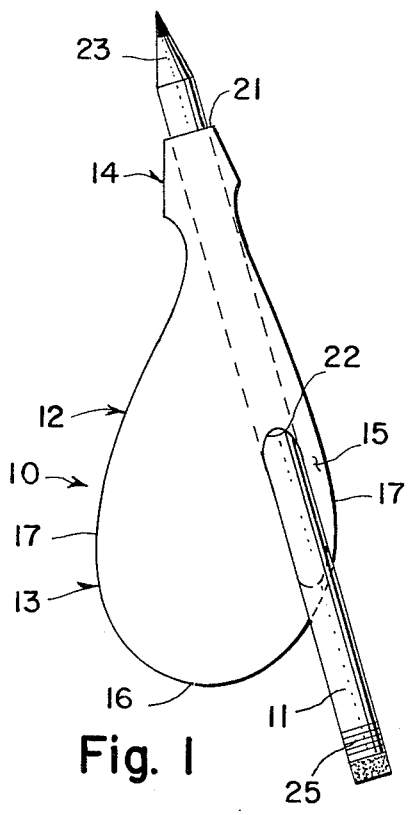
FIG. 1 illustrates a top view of a pen holder device.
Figure 2:
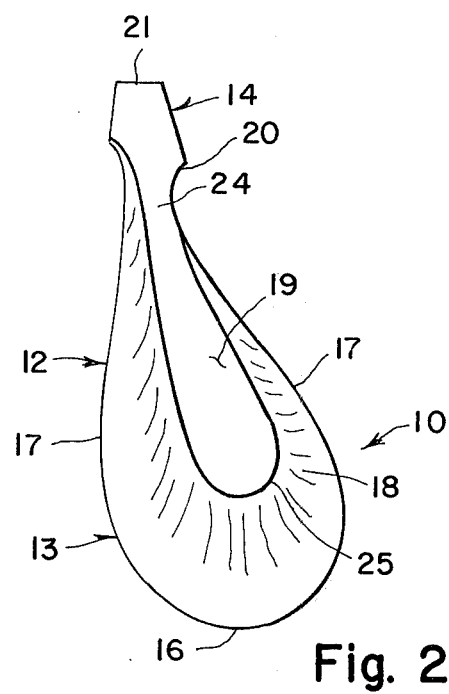
FIG. 2 illustrates a bottom view of the pen holder device.
Figure 3:
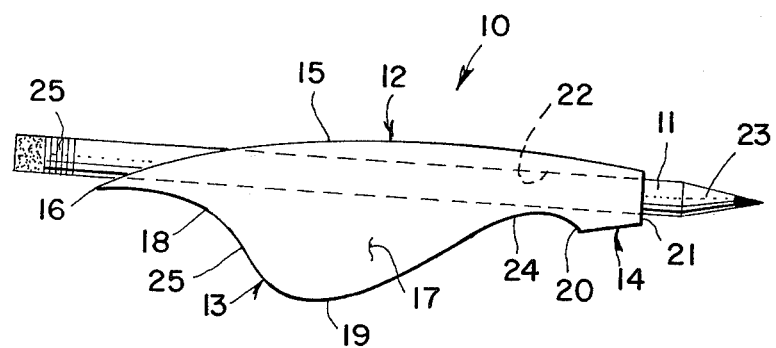
FIG. 3 illustrates a side view of the pen holder device.

Turning now descriptively to the drawings, in which similar reference characters denote similar elements throughout the several views, FIGS. 1–3 show a pencil holder device 10 used to hold a pencil 11 or pen in a correct position within a hand of a user for teaching proper penmanship. The pen holder device 10 consists of a one piece three dimensional molded body 12 having a rear palm portion 13 and a forward finger grip portion 14. The top base 15 of a slightly convex curvative extends from a thin rear tail end 16 of portion 13 to the forward end 21 of portion 14. The sidewall 17 of the body 12 are of a convex curvative. The bottom base 18 of the body 12 curves concavely downward from end 16 to an enlarged center section 19 forming a rear vertical shoulder 25 of section 19. The bottom base 18 curves concavely upward in a forwardly direction from said section 19 to a convex grove section 24 having a forward shoulder 20. The bottom base 18 extends forwardly from shoulder 20 to end 21 having a planar surface. The bottom face of the tail end 16 rests on top of the web portion of the hand between the thumb and the first finger, wherein the outside contour of the sidewalls 17 of the palm portion 13 of the body 12 engage the palm of the user's hand as held in a writing position. The palm of the hand also engages the rear vertical shoulder 25 of the center enlarged section 19 of the bottom base 18. The middle finger engages the grove section 24 of the body 12. The thumb and first finger hold the finger grip portion 14 of the body 12. The body 12 has a bore 22 therein extending from the forward end 21 to a top right center of the top base 15. A pencil 11 extends through bore 22, wherein the writing end 23 of the pencil 11 protrudes outward from the forward end 21 of the body. The rear end 25 extends rearwardly outward from the bore 22 resting on the top base 15 of the body 11.

Hence, obvious changes may be made in the specific embodiment of the invention described herein, such modifications being within the spirit and scope of the invention claimed, it is indicated that all matter contained herein is intended as an illustrative and not as limiting in scope.

Having thus described the invention, what I claim as new and desire to secure by Letters Patent of the United States is:

1. A pencil holder device used to hold a pencil in a proper position for writing, which comprises:
   a. a one piece molded plastic body having a rear palm portion and a forward finger grip portion;
   b. a slightly convex curved top base extending from a thin rear tail end to a forward end of said body;
   c. said body having convex curved sidewalls;
   d. a bottom base concavely curved downward from said thin rear tail end to an enlarged center section;
   e. said bottom base concavely curved upward in a forward direction from said enlarged center section to a convex grove section having a forward shoulder;
   f. said bottom base extending forwardly from said forward shoulder to said forward end; and
   g. a first means of affixing said pencil to said body.

2. A pencil holder device as recited in claim 1, wherein said first means comprises:
   a. said body having a bore therethrough, wherein said bore extends from said forward end to a top right center of said top base of said body; and
   b. said pencil contained in said bore, wherein a writing end of said pencil protrudes outward from said forward end of said body.

* * * * *